Aug. 31, 1943. H. C. BOSTWICK Re. 22,369

COLLAPSIBLE FORM

Original Filed July 16, 1936

Inventor,

H. C. Bostwick,

By Robert McPherson,

Attorney

Reissued Aug. 31, 1943 Re. 22,369

UNITED STATES PATENT OFFICE 22,369

COLLAPSIBLE FORM

Henry C. Bostwick, Akron, Ohio, assignor to The Akron Standard Mold Company, Akron, Ohio, a corporation of Ohio Original No. 2,073,729, dated March 16, 1937, Serial No. 90,958, July 16, 1936. Application for reissue March 15, 1939, Serial No. 261,977

10 Claims. (Cl. 154—9)

This invention relates to collapsible, segmental winding forms or drums for building bands such as those for forming tires by the so-called pulley-band method.

The object of my invention is to facilitate removal of the tire band, especially when the drum is high-crowned or made with deep, undercut flanges against which the tire beads are positioned as in the formed tire. If these deep flanges are rigidly formed on the drum segments, the overlying segments, when the drum is collapsed, will "pile up" on the underlying ones so as considerably to reduce the extent of collapse. The present invention avoids this difficulty by an improved arrangement of detachable bead-seating flanges.

Of the accompanying drawing, Fig. 1 is a rear elevation, in section through the shaft, of a tire-building drum provided with detachable bead flanges in accordance with my invention.

Figure 1:
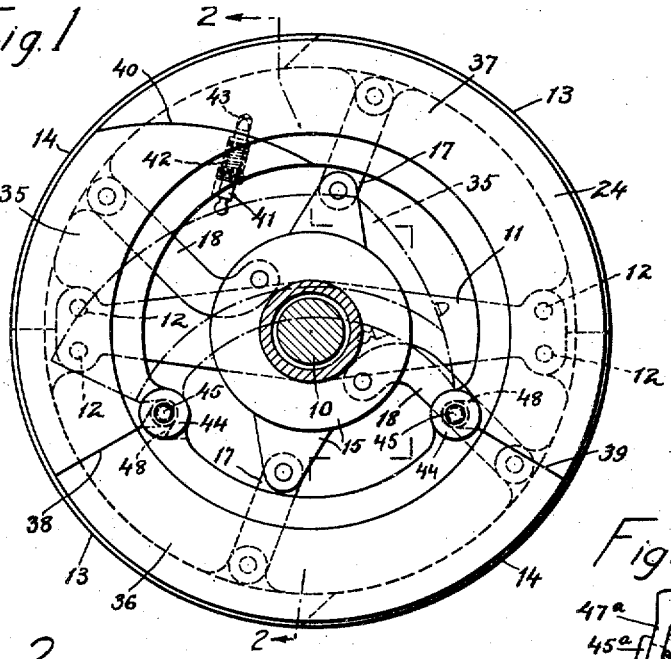

The drawing illustrates this invention as applied to a drum of the general type disclosed in my Patent No. 2,042,498 of June 2, 1936. 10 is a horizontal rotary power shaft to which is fixed a central segment support or spider 11 consisting of a hub and a pair of opposite arms. To the ends of these arms, on hinge pins 12, are pivoted two pairs of chuck body segments comprising duplicate members 13 with underlapping ends and duplicate members 14 with overlapping ends meeting those of the segments 13 in expanded condition, said segments, being arranged in couples, with oppositely swinging members. To operate the segments, there is provided the usual toggle control including a sleeve or collar 15 concentric with the shaft and rotatable with or relative thereto at the end of a hollow shaft 16, a pair of short links 17 connected with the underlapping segments 13 and forming, with arms on said collar, a pair of toggles which are not fully straightened in the expanded position, and a pair of longer bent links 18 forming another pair of toggles with said collar, the knuckle pins of which pass over center in reaching the expanded condition. When the collar 15 and hollow shaft 16 are retarded while the drum is forwardly rotating, as by means of a brake (not shown), the toggles will fold and collapse the drum by its power of rotation. It is also common to collapse such drums by a hand-wheel. Reverse rotation of the drum while the control collar is held will expand the drum, and it may also be automatically expanded by centrifugal force when rotated in either direction. It will be understood that the invention may also be applied to other types of drums.

This illustrated drum has the usual widthwise adjustment being formed with body segments 19 hinged to the spider and connected with the toggle links, wing segments 20 adjustably fixed thereon by screws 21 whose stems occupy slots 22 in the body segments, and thin gap-shield segments 23 affixed to a central flat rib structure on the body segments.

In the preferred embodiment of my invention here illustrated, there is removably mounted in each end of the drum body, which includes the base and wing segments, a segmental collapsible bead-seating flange or ring 24 having a short cylindrical portion 25 flush with the cylindrical outer surface of the adjacent wing segment 20, a rounded shoulder portion 26, an undercut bead-seating portion 27, and an inner marginal radial portion 28. Said bead ring also has an axially extending mounting flange 29 fitted and locked against outward radial movement within the marginal portion of the wing segment, and interlocked therewith against axial movement by a circumferential rib 30 on the ring flange occupying a complemental groove 31 on the wing segment. A slanting inward movement of the bead ring segments, to clear each of them from the tire beads when the ring is to be removed, is provided for by forming interfitting male and female cones 32 and 33, parallel with the bead seat 27 on the ring and wing segment respectively, and forming the end of the base segment 19 with a corresponding undercut bevel 34.

Each of the bead rings 24 is transversely divided into segments, preferably unequal in number and/or angular length to the drum body segments so as to break joints therewith, said ring segments in this case being three in number including a key segment 35, an intermediate segment 36 and a last segment 37. Radial joints 38 and 39 are formed between the respective pairs 35, 36 and 36, 37, and a semitangent joint 40, with a curved underlapping surface on the key segment and a complemental overlapping surface on the last segment, both concentric with the pivot of said key segment, is formed between these two. At the joint 40, there is provided any suitable form of spring lock or latch, such as a slidable bolt 41 carried by the key segment 35 and yieldingly pressed by a spring 42 into a socket 43 in the last segment 37. On swinging the key segment outwardly into its operative position, this latch will automatically lock together the ends of the segments 35 and 37 against the pressure of the stitching tools as they round the shoulders of the drum and to release the latch, it may be manually withdrawn by pulling on the head at its inner end.

Figure 3:
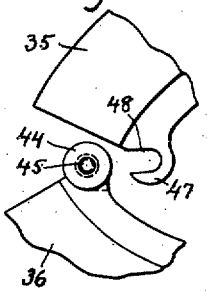
Fig. 3 is a fragmental elevation showing the collapsed relation of adjoining flange segments and separation of their pivotal connection.

The respective pairs of segments 35, 36 and 36, 37 are pivotally connected in end-to-end relation at their inner periphery by means of an ear 44 on the posterior one of said segments (such as 36 for the pair 35, 36), an axially extending pivot stud 45 screwed into said ear and formed with a head 46 at its inner end, and an adjacent ear 47 lying inwardly of the ear 44 and movable both pivotally of said stud 45 to swing the anterior segment into an angular relation with the posterior one, and axially of the stud, to allow a bead clearing movement of the ring segment inwardly of the drum in an axial direction, the combined movement being a slanting one permitted by the beveled surfaces 32, 33 and 34. Ear 47 is also formed with a slot or open-sided bearing recess 48 which, when the segments are circumferentially aligned, is semitangently slanted outwardly in a direction toward the adjoining segment so as normally to lock the pivot joint against inward radial separation of the anterior segment from the posterior one, but adapted to permit such separation as shown in Fig. 3 when the anterior segment, such as 35, is swung through a sufficient angle to move the sides of the slot to or beyond a position of parallelism with the radial joint 38.

Figure 2:
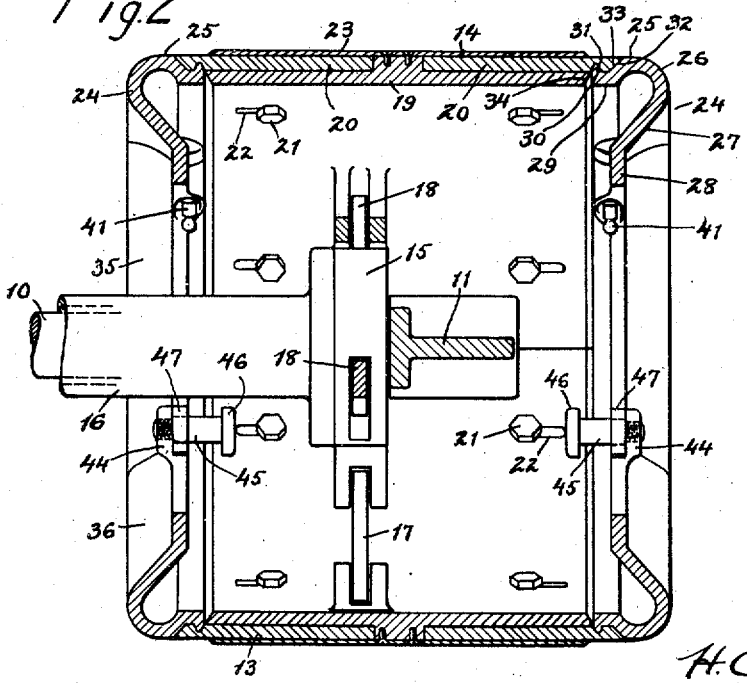
Fig. 2 is a longitudinal section, approximately on the line 2—2 of Fig. 1.

In the operation of this invention, when the drum body has been expanded into a circle as shown in Figs. 1 and 2, the bead ring segments 35, 36 and 37 may be connected end-to-end and successively assembled in said body and interlocked with the wing segments 20 by means of the rib 30 and groove 31, by placing the segment 37, then 36 and finally 35, which will be interlocked by the latch bolt 41 with the segment 37 as the key segment 35 is swung outwardly into position. Each of the bead rings 24 is preferably in an indeterminate angular relation with the drum body, being placeable in any rotative position with respect to said body, to simplify the structure and save time in its assembly. The presence of these bead rings lends radial support to the body segments 13 and 14, supplementing the action of the toggles in avoiding any unintended collapse of the drum, and acting to hold the ends of the drum-body segments in alignment. When the tire band is completed, the rings 24 are removed, one segment at a time, beginning with the key segment 35, and in the course of their removal, after unseating the segment from the drum body, it may be turned endwise into an interior space of the drum before its removal through the central aperture of the bead on that side. On removal of both bead rings, the drum body may then be collapsed in the usual manner, either by hand or by the power of its rotation, through retardation of the control collar 15.

Figure 4:
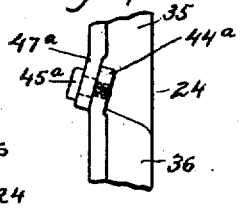
Fig. 4 is a fragmental edge view of adjoining flange segments showing a modified pivotal connection.

Fig. 4 represents a modified pivotal connection between adjoining bead ring segments such as an anterior key segment 35 and a posterior intermediate segment 36, according to which the hinge ears 44a and 47a on the respective segments are connected by a hinge stud or pin 45a whose axis is slantingly disposed at an angle to the drum axis so that a collapsing swinging movement of the anterior segment will be in an approximately helical direction inwardly of the drum to aid in clearing said segment from the adjacent tire bead. This pivot joint may be made separable as previously described, to allow individual removal of the segments.

It will be understood that other changes of embodiment may be made. For example, while it is preferred to make the bead flanges as full-depth rings detachable from the drum body at the latter's outer periphery, to permit the greatest extent of collapse of said body, the invention is not wholly restricted to such an arrangement.

I claim:

1. A tire-building form comprising a collapsible, segmental form body, and an independently collapsible segmental, bead-seating flange structure removably mounted thereon and composed of segments detachable by moving them radially inward from the form body.

2. A tire-building form comprising a collapsible, segmental form body, and a collapsible bead-seating ring removably mounted thereon, and composed of a series of segments whose adjoining members are pivotally connected with each other, interlocking with the form body by an outward radial movement.

3. A tire-building drum comprising a central rotary segment support, a collapsible drum body permanently mounted thereon and composed of pivoted segments, and a pair of collapsible, segmental, bead-seating rings removably locked in the ends of said body and serving to hold the body segments in expanded condition.

4. A tire-building form comprising a collapsible, segmental form body, and a collapsible, segmental bead-seating ring detachably fitted in the end of said body in an underlapping relation thereto, and inwardly separable from the body, said ring and body having complemental abutting surfaces adapted to permit a slanting inward separating movement of said ring radially and axially of the form.

5. A tire-building form according to claim 4 in which the ring is formed with an undercut bead-seating portion, and it and the ring-abutting surfaces of said form are beveled to allow a slanting separating movement of said ring inwardly of the form.

6. A tire-building form comprising a radially collapsible, segmental form body, and a bead-seating ring detachably mounted thereon and composed of segments separably connected in series, and detachable from the form body by and inward radial movement, said segments being connected by separable pivot joints permitting the individual removal of the segments while the body segments remain expanded in the tire band.

7. A tire-building form, comprising a collapsible, segmental form body, and an undercut, bead-seating ring detachably mounted thereon and composed of segments pivotally connected in series and having pivotal and axial callapsing movements inwardly of the form to clear them of the tire-beads.

8. A tire-building form according to claim 7 in which the pivot joint between a pair of ring segments includes an axially extending pivot pin on one segment and an ear on the other segment rotatable on said pin and slidable therealong to separate the segments.

9. A tire-building form according to claim 7 in which the axes of the pivot joints are disposed angularly of the form axis to make the ring segments collapsible substantially in a helical direction.

10. A drum type tire building core comprising a central segmental collapsible band, and independently collapsible side rings engaging the interior of said central band.

HENRY C. BOSTWICK.